United States Patent [19]

Fukushima et al.

[11] 4,425,765

[45] Jan. 17, 1984

[54] AIR CONDITIONER FOR AUTOMOBILES

[75] Inventors: Toshihiko Fukushima, Shimoinayoshi; Seigo Miyamoto, Takahagi; Kenichi Kawashima, Shimoinayoshi; Toshiaki Kawabata, Tokyo; Seijiro Tani, Nakamachi; Takanori Shibata, Hitachi, all of Japan

[73] Assignee: Hitachi, Ltd., Tokyo, Japan

[21] Appl. No.: 320,535

[22] Filed: Nov. 12, 1981

[30] Foreign Application Priority Data

Nov. 12, 1980 [JP] Japan .............................. 55-158291

[51] Int. Cl.$^3$ ........................... B60H 3/04; F25B 1/00
[52] U.S. Cl. ....................................... 62/133; 62/215; 62/230; 62/244; 62/323.4; 62/406
[58] Field of Search ............... 62/133, 215, 241, 243, 62/244, 239, 323.4, 230, 226, 228, 59, 201, 139, 406, 434, 437

[56] References Cited

U.S. PATENT DOCUMENTS 3,918,543 11/1975 Halem ................................ 62/323.4
4,275,688 6/1981 Abe et al. ............................... 62/133
4,305,258 12/1981 Spencer, Jr. ............................ 62/133

FOREIGN PATENT DOCUMENTS 55-152618 11/1980 Japan .................................. 62/323.4

*Primary Examiner*—William E. Wayner
*Assistant Examiner*—Harry Tanner
*Attorney, Agent, or Firm*—Antonelli, Terry & Wands

[57] ABSTRACT

An automobile air conditioner has a refrigeration cycle composed of a compressor, condenser, liquid tank, orifice means and an evaporator, as well as mechanical parts such as a radiator and radiator fan associated with the condenser and a blower combined with the evaporator. The compressor is operatively connected to the automobile engine through a connecting means so as to be driven by the engine selectively in accordance with the temperature in the passenger's compartment. According to the invention, the compressor is driven when the automobile is being braked, even if the temperature in the compartment is lower than a set temperature, to make an efficient use of the kinetic energy possessed by the mass of the automobile. The cold energy generated during braking is suitably stored and is released into the passenger's compartment as desired.

6 Claims, 6 Drawing Figures

AIR CONDITIONER FOR AUTOMOBILES

BACKGROUND OF THE INVENTION

1. Field of the Invention

The present invention relates to an air conditioner for automobiles, having a compressor adapted to be driven by the automobile engine, a condenser connected to the high-pressure side of the compressor and an evaporator connected to the low-pressure side of the compressor.

2. Description of the Prior Art

The air conditioner for automobiles usually has a refrigeration cycle constituted by a compressor adapted to be driven by the automobile engine, a condenser, a liquid tank, an orifice means such as an expansion valve and an evaporator. The air conditioner further has a radiator fan for use in combination with the condenser, and also a blower for the evaporator and so on.

Among these constituents of the air conditioner, the compressor, condenser, liquid tank and the radiator are disposed in the engine room, while the evaporator and the blower are disposed in the passenger's compartment of the automobile.

In air conditioners for automobiles, the temperature in the passenger's compartment is adjusted automatically by an on-off control of the compressor. Namely, when the measured temperature in the passenger's compartment has become a predetermined temperature, the compressor is turned operative to start the refrigeration cycle thereby to lower the temperature, while, when the temperature has become lower than another predetermined temperature, the compressor is automatically turned off to stop the refrigeration cycle thereby to recover the temperature.

Thus, in the prior art air conditioners, the compressor is turned operative and inoperative in accordance with the result of detection of the temperature solely, regardless of the running condition of the automobile.

On the other hand, the rate of increase of the fuel consumption due to the driving of the compressor varies depending on the running states of the automobile.

For instance, when the automobile is running at a constant speed of, for example, 40 Km/hr, the rate of fuel consumption (l/hr) is increased by about 20% due to the driving of the compressor. However, when the state of the engine braking for decelerating or stopping the automobile, the fuel consumption rate is not changed independently of whether the compressor is operating or not. Namely, when the automobile is being decelerated or stopped by the engine braking, a part of the kinetic energy possessed by the mass of the automobile is used for driving the compressor. In other words, the compressor produces a resistance which in turn acts as a part of the braking force.

In the prior art air conditioners, however, the operation of the compressor is controlled in accordance with the result of detection of the temperature in the passenger's compartment solely, as stated before. In such air conditioners, therefore, it is impossible to make efficient use of the kinetic energy of the automobile as the driving energy for driving the compressor of the air conditioner. Namely, it is not possible to reduce the fuel consumption rate of the engine for driving the compressor through efficient use of the kinetic energy of the automobile.

SUMMARY OF THE INVENTION

Accordingly, an object of the invention is to provide an air conditioner for automobiles, capable of making an efficient use of the kinetic energy of the automobile which is wasted uneconomically during engine braking, thereby to suppress the increase of the fuel consumption rate due to the driving of the compressor of the air conditioner.

To these ends, according to the invention, there is provided an air conditioner for automobiles comprising means for detecting the temperature in the passenger's compartment, and means for detecting the braking state of the automobile in which various brakes are used for stopping or decelerating the automobile, whereby the compressor of the air conditioner is put into operation when the automobile is being braked, even if the temperature in the compartment is below the predetermined temperature.

DESCRIPTION OF THE PREFERRED EMBODIMENTS

Figure 1:
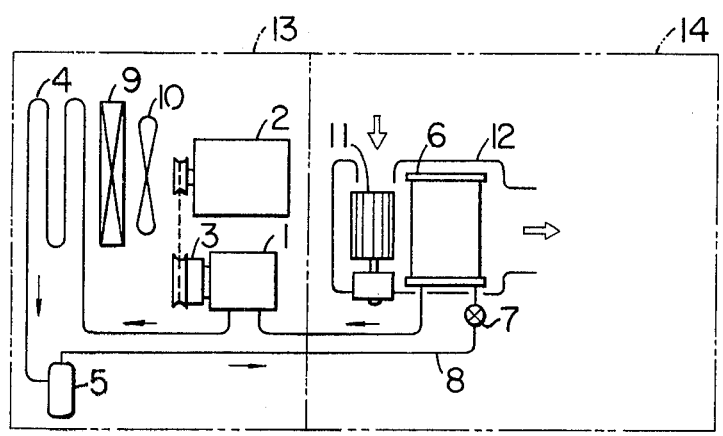
FIG. 1 is a schematic illustration of the basic arrangement of an automobile air conditioner in accordance with the present invention.

An example of the basic arrangement of automobile air conditioner in accordance with the invention will be described hereinunder with specific reference to FIG. 1. A compressor 1 is operatively connected to an engine 2 through a connecting means 3 such as a clutch, torque converter or the like. A refrigerant pipe 8 is provided to connect the compressor 1, condenser 4, liquid tank 5, evaporator 6 and an orifice means 7 to compose a refrigeration cycle.

A radiator 9 and a radiator fan 10 are disposed to oppose to the condenser 4, while a blower 11 is disposed in a housing 12 to oppose to the evaporator 6 which is also accommodated by the housing 12.

The compressor 1, condenser 4, liquid tank 5, radiator 9 and the radiator fan 10 are disposed in the engine room 13, while the evaporator 6 and the blower 11 are disposed in the passenger's compartment 14 of the automobile.

The air conditioner of the invention further has means for detecting the temperature Tr in the passenger's compartment, means for detecting the braking state of the automobile, and means for setting the command temperature optimum for the passenger's compartment.

In operation, the high temperature gaseous refrigerant of a high pressure discharged from the compressor 1 is condensed and cooled to become a liquid refrigerant of high pressure as it flows through the condenser 4 which is cooled by the natural draft generated as the automobile runs, with the assist of the radiator fan 10. The surplus liquid refrigerant is stored in the liquid tank 5. The liquid refrigerant discharged from the liquid tank 5 is made to pass through the orifice means 7 so that the pressure of the liquid refrigerant is lowered for an easy evaporation before the liquid refrigerant flows into the evaporator 6. The liquid refrigerant then flows through the evaporator to receive the heat corresponding to the evaporation latent heat from the air which is forcibly induced from the passenger's compartment and recirculated by the blower 11, thereby to cool the air. The cooled air is returned to the passenger's compartment 14, while the refrigerant, which has been evaporated through the heat exchange with the air, is returned to the compressor 1.

Figure 2:
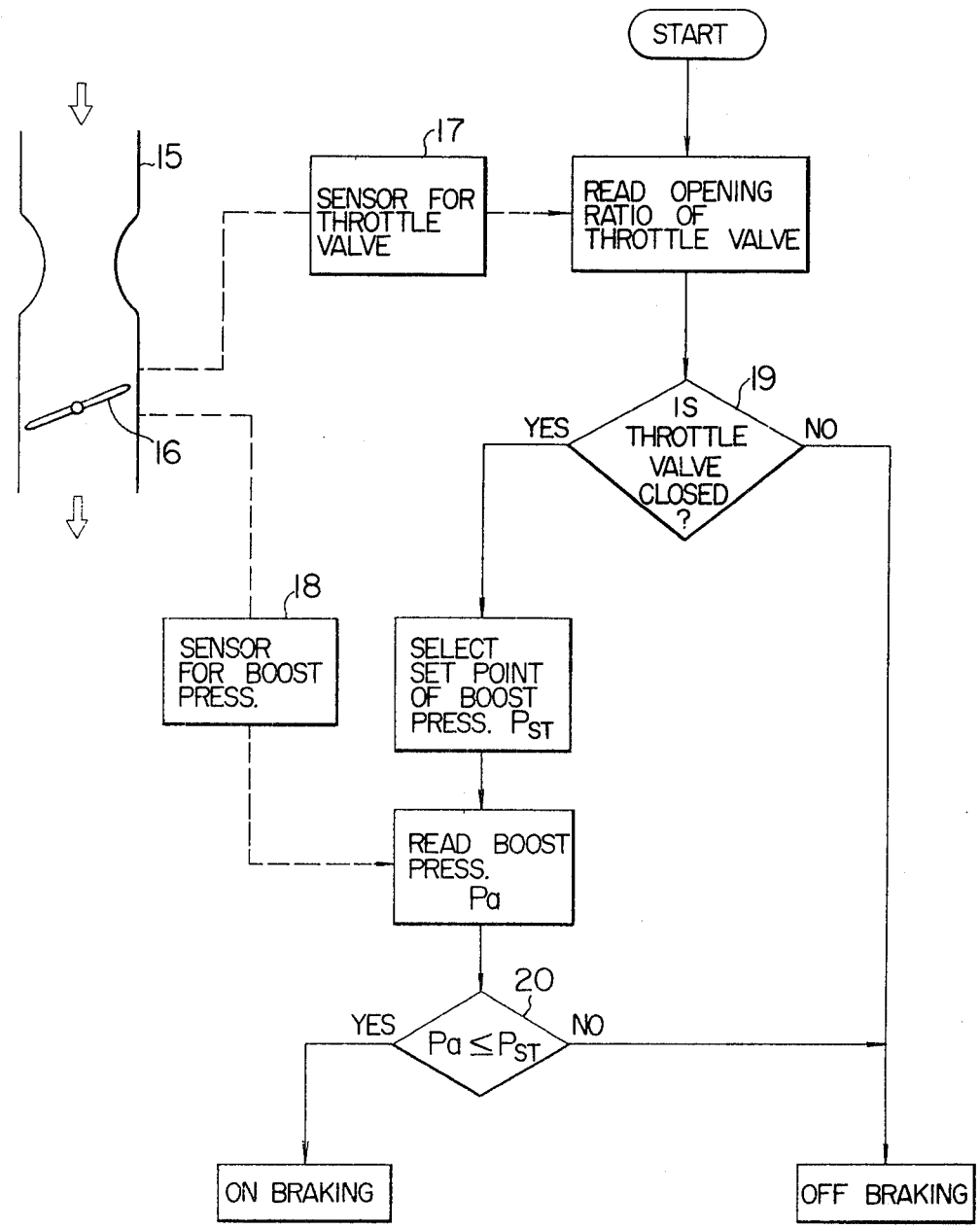
FIG. 2 is a flow chart showing an example of means for detecting the braking state of the automobile, incorporated in the automobile air conditioner in accordance with the invention.

FIG. 2 shows an example of the means for detecting the braking state of the automobile. The braking state of the automobile is generally detectable through sensing the operation of the foot brake or the deceleration of the automobile body. As a matter of fact, however, it is not easy to precisely detect the braking state of the automobile, because, when the automobile is running along an ascending road, the automobile is decelerated even though the automobile is not being braked while, when the automobile is running along a descending slope, the automobile is accelerated even though the brake is put into effect.

Referring to FIG. 2, when the engine brake and the foot braking are working to decelerate the automobile, the throttle valve 16 of the carburetor 15 is closed and the engine is externally driven by the kinetic energy of the automobile. In this state, the boost pressure is largely decreased. It is, therefore, possible to detect the braking state of the automobile through detecting the state of the throttle valve 16 by means of a throttle valve opening detector 17 such as a potentiometer, limit switches or the like, while detecting the boost pressure by a boost pressure detector 18 such as a pressure switch. The state of the throttle valve 16 is judged by a judging means 19 which receives a signal from the throttle valve opening detector 17. When the throttle valve 16 is in the closed state, the signal from the boost pressure detector 18 is compared by a comparator means with a previously set value to judge whether the instant boost pressure is below a set value or not and in the event that the boost pressure is below the set value, it is judged that the automobile is being braked. To the contrary, it is judged that the automobile is not being braked, when the throttle valve 16 is opened or when the boost pressure is higher than the boost pressure.

It is thus possible to precisely detect the braking state of the automobile without fail by detecting both of the state of the throttle valve and the boost pressure.

Figure 3:
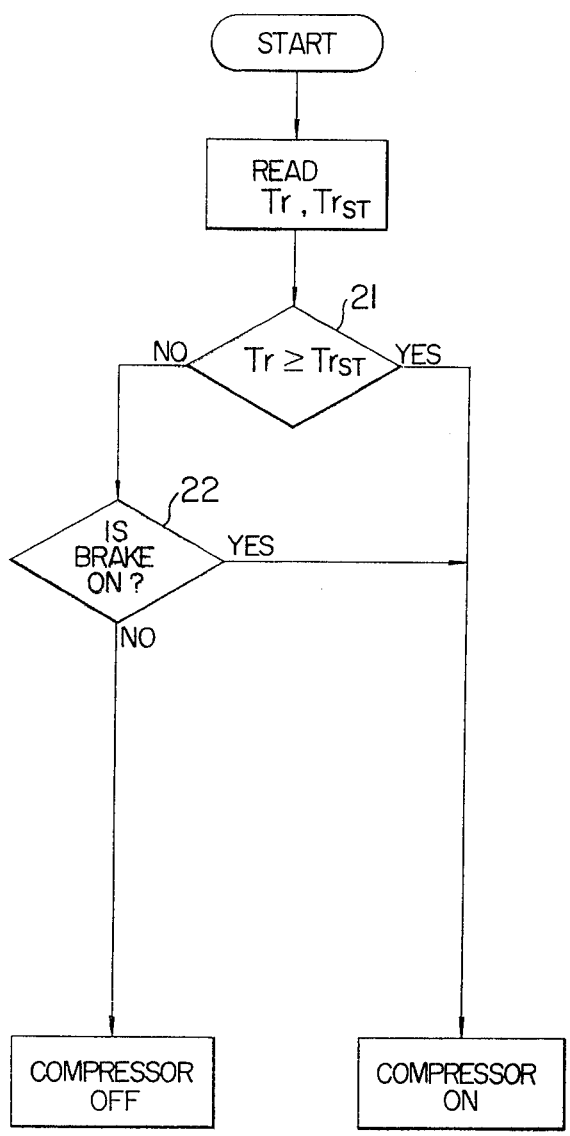
FIG. 3 is a flow chart for explaining an example of a method for operating an automobile air conditioner in accordance with the invention.

A method of operating the automobile air conditioner in accordance with the invention will be described hereinunder with reference to FIG. 3 showing the flow chart of the operation. Both of the temperature Tr of the passenger's compartment and the state of the braking of the automobile are detected during the operation of the air conditioner. As a first step, the detected temperature Tr is compared by a set temperature Trst by means of a comparator 21. If the detected temperature Tr is higher than the set temperature Trst, the connecting means 3 connects the compressor 1 to the engine 2 so that the latter drives the compressor 1. To the contrary, in the event that the temperature Tr of the passenger's compartment is below the set temperature Trst, a judgement is made as to whether the automobile is being braked or not, by the braking state detecting means 22 as shown in FIG. 2. The compressor 1 is driven whenever the automobile is being braked, regardless of the temperature Tr of the passenger's room, whereas, when the automobile is not being braked, the compressor 1 does not work.

According to this arrangement, it is possible to sufficiently cool the air in the passenger's compartment by making an efficient use of the kinetic energy of the automobile, and a sufficient cold is stored in the passenger's compartment. Thanks to the storage of the cold, the time length until the temperature Tr is increased to exceed the set temperature Trst is prolonged, although the compressor 1 stops to work as the braking state is over. This means that the time length of suspension of operation of the air compressor is prolonged and, accordingly, the consumption of the energy, i.e. the fuel, for cooling the passenger's compartment is decreased advantageously.

Figure 4:
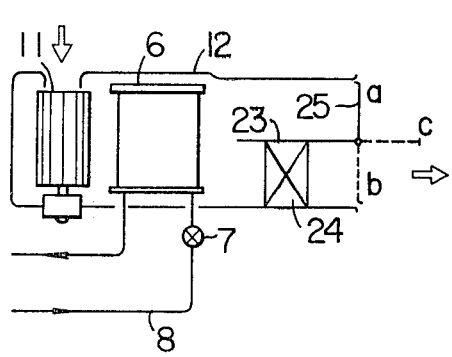
FIGS. 4 and 5 are schematic illustrations of automobile air conditioners of different embodiments.

FIG. 4 shows another embodiment of the invention in which a cold heat accumulator and a damper are disposed in the passenger's compartment. Namely, in this case, the cold is not stored in the air in the passenger's compartment but in the cold heat accumulator which is designed and constructed to release the cold as desired. The space at the downstream side of the evaporator 6 in the housing 12 is divided into two channels by means of the partition wall 23, and the cold heat accumulator 24 is disposed in at least one of these channels. A damper 25 pivotally mounted to the partition wall 23 is adapted to open and close two channels selectively. Other portions of this embodiment are materially identical to those of the first embodiment. The operation of the second embodiment shown in FIG. 4 is as follows. When the temperature Tr is below the set temperature Trst while the automobile is being braked, the damper 25 is set at the position "a" to direct the cold air from the evaporator 6 toward the cold heat accumulator 24 in which the cold heat is accumulated. When the cooling power of the air conditioner is too small for the cooling load, as in the case of idling of the engine or the case where the heat input to the passenger's compartment is large, the damper 25 is set at the position "b" or "c" so that the cold heat accumulated in the cold heat accumulator is released into the air in the passenger's compartment thereby to assist the air conditioner in cooling the air in the passenger's compartment.

In the first embodiment described before, the cold is stored by the air in the passenger's compartment so that the air is often cooled excessively to impart an unpleasant feel to the driver and passengers. In addition, the cold tends to escape to the outside due to the outward leak of the cooled air. In the second embodiment of the invention, however, the cold heat is effectively accumulated and stored in the cold heat accumulator having a sufficiently large storage capacity, so that the above-mentioned shortcomings are completely eliminated.

Figure 5:
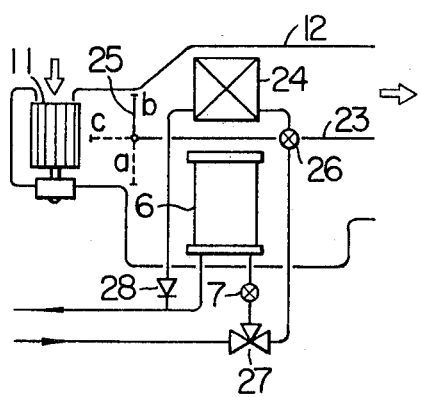

In the embodiment shown in FIG. 4, the cold heat accumulator 24 and the damper 25 are disposed at the downstream side of the evaporator 6. This, however, is not exclusive and the arrangement shown in FIG. 4 may be substituted by an arrangement shown in FIG. 5. Namely, in the arrangement shown in FIG. 5, the space in the housing 12 is divided into two channels by a partition wall 23. The evaporator is disposed in one of the channels while a cold heat accumulator 24 is disposed in the other ahannel. One end of the cold heat accumulator 24 is connected to the inlet side of the evaporator 6 through an orifice means 26 and a three-way valve 27, while the other end of the cold heat accumulator 24 is connected to the outlet side of the evaporator 6 through a valve means 28 such as a check valve or a solenoid valve. A damper is disposed between the evaporator 6 and the blower 11. In operation, when the automobile is being braked while the temperature Tr in the passenger's compartment is still lower than the predetermined set temperature Trst, the three-way valve 27 is switched to introduce, after a pressure reduction through the orifice means 26, the high-pressure liquid refrigerant from the liquid tank (not shown) into the cold heat accumulator 24, so that the liquid refrigerant is evaporated in the cold heat accumulator 24 to cool the latter. In the event that the air conditioner cannot provide the cooling power to sufficiently cool the air in the passenger's compartment as in the case of idling of the engine or in the case where the heat input to the compartment is too large, the damper 25 is set at the position "a" and "c" so that the cold is released from the cold heat accumulator 24 into the compartment to assist the air conditioner.

In the ordinary state of operation of the air conditioner, the damper 25 is set at the position "b", so that only the air cooled through the evaporator 6 is discharged into the passenger's compartment.

According to the embodiment stated above, it is possible to stop the blower 11 during storage of the cold heat in the cold heat accumulator 24, so that the energy is saved considerably.

Figure 6:
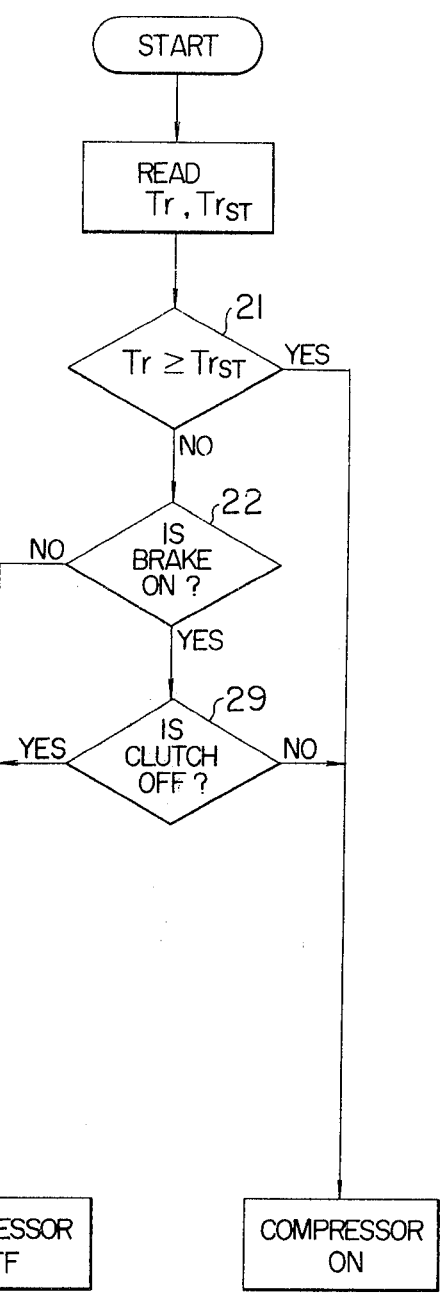
FIG. 6 is a flow chart for explaining another example of a method for operating an automobile air conditioner in accordance with the invention.

FIG. 6 is a flow chart for explaining the operation of an automobile air conditioner in accordance with another embodiment of the invention. This operating method differs from that shown in FIG. 3 in that a means 29 is provided for detecting the state of the clutch in the power transmission system of the automobile. More specifically, according to this operating method, the compressor is stopped when the clutch in the power transmission system is in the off state, i.e. in the non-torque transmission state, even though the automobile is being braked while the temperature Tr in the passenger's compartment is lower than the set temperature Trst. According to this operating method, when it has become impossible to drive the compressor by the kinetic energy of the automobile due to the disconnection of the clutch, the clutch in the compressor driving system is also turned off to reduce the load on the engine, thereby to further contribute to the saving of the energy. In general, when the clutch of the power transmission system is turned off, the boost pressure of the engine is increased because the engine is not driven by the kinetic energy of the automobile. In this connection, it is advisable to employ, in the operating method shown in FIG. 6, a detecting means as shown in FIG. 2 as the means 22 for detecting the braking state of the automobile. By so doing, it becomes not necessary to employ a specific detector such as the detection means 29 for detecting the state of the clutch and, hence, to reduce the number of sensors incorporated in the system while simplifying the construction of the control circuit.

In the embodiments of the invention described hereinbefore, the temperature in the passenger's compartment is adjusted by an on-off control of the compressor in accordance with the result of detection of the temperature. This invention, however, is not exclusive and the invention is applicable to the air conditioners in which the cooling power is changed by changing the capacity of the compressor by changing, for example, the number of revolutions of the compressor or the number of compressor units taking part in the operation. In such a case, the capacity of the compressor is maximized when the automobile is being braked to make an efficient use of the kinetic energy processed by the mass of the automobile.

As has been described, according to the invention, it is possible to reduce the energy consumed for driving the compressor of the automobile air conditioner for effectively utilizing the kinetic energy of the automobile which is, for otherwise, wasted uneconomically during braking of the automobile, so that the fuel consumption rate is remarkably reduced advantageously.

Although the invention has been described through specific terms, the described embodiment is not exclusive and various changes and modifications may be imparted thereto without departing from the scope of the invention which is limited solely by the appended claims.

What is claimed is:

1. An air conditioner for automobiles having a compressor adapted to be driven by an automobile engine, a condenser connected to the high-pressure side of said compressor, orifice means connected to the condenser and an evaporator connected to the low-pressure side of said compressor, said compressor, condenser, orifice means and said evaporator in combination constituting a refrigeration cycle, characterized by comprising: means for detecting the temperature in the passenger's compartment of said automobile; means for setting the optimum temperature in said compartment; and means for detecting the braking state of said automobile; wherein said compressor is driven during braking of said automobile even when the temperature in said compartment is still lower than the set temperature, thereby to operate said refrigeration cycle to store the cold; and further comprising means for detecting the state of the clutch of the power transmission system of said automobile, whereby said compressor is stopped when said clutch is turned off even when said automobile is being braked while said temperature in said compartment is lower than said set temperature.

2. An air conditioner for automobiles as claimed in claim 1, characterized by further comprising means for detecting the opening degree of a throttle valve of a carburetor attached to said engine, means for detecting the boost pressure of said engine, and comparator means for comparing said boost pressure with a set boost pressure, whereby the braking state of said automobile is detected through the detection of the opening degree of said throttle valve and the detection of said boost pressure.

3. An air conditioner for automobiles as claimed in any one of claims 1 or 2, wherein said evaporator is disposed together with a blower within a housing, characterized by further comprising a cold heat accumulator for storing cold heat and a damper for switching for flow of air, said cold heat accumulator and said damper being disposed in the vicinity of said evaporator.

4. An air conditioner for automobiles comprising a compressor adapted to be driven by an automobile engine, a condenser connected to the high-pressure side of said compressor, orifice means connected to the condenser and an evaporator connected to the low-pressure side of said compressor, said compressor, condenser, orifice means and said evaporator in combination constituting a refrigeration cycle, characterized by comprising: means for detecting the temperature in the passenger's compartment of said automobile; means for setting the optimum temperature in said compartment; and means for detecting the decelerating state of said automobile; wherein said air conditioner further comprises means for comparing the temperature in the passenger's compartment with the set optimum temperature, said compressor being driven when the temperature in the passenger's compartment is higher than the set optimum temperature and furthermore, said compressor also being driven when said automobile is in a decelerating state, even when the temperature in the passenger's compartment is not higher than said optimum temperature, to operate said refrigeration cycle to store the cold, whereby the time during which said compressor is driven by means of said automobile engine, in states other than the decelerating state, is reduced; and wherein the space in said housing accommodating said evaporator downstream from said evaporator is divided into two channels by a partition wall, one of said two channels having said cold heat accumulator, said damper being attached to said partition wall.

5. An air conditioner for automobiles comprising a compressor adapted to be driven by an automobile engine, a condenser connected to the high-pressure side of said compressor, orifice means connected to the condenser and an evaporator connected to the low-pressure side of said compressor, said compressor, condenser, orifice means and said evaporator in combination constituting a refrigeration cycle, characterized by comprising: means for detecting the temperature in the passenger's compartment of said automobile; means for setting the optimum temperature in said compartment; and means for detecting the decelerating state of said automobile; wherein said air conditioner further comprises means for comparing the temperature in the passenger's compartment with the set optimum temperature, said compressor being driven when the temperature in the passenger's compartment is higher than the set optimum temperature and furthermore, said compressor also being driven when said automobile is in a decelerating state, even when the temperature in the passenger's compartment is not higher than said set optimum temperature, to operate said refrigeration cycle to store the cold, whereby the time during which said compressor is driven by means of said automobile engine, in states other than the decelerating state, is reduced; and wherein the space in said housing is divided by a partition wall into two channels one of which accommodating said evaporator while the other accommodates a cold heat accumulator which is communicated with said evaporator through a three-way valve and said orifice means, said damper being attached to said partition wall.

6. An air conditioner for automobiles having a compressor adapted to be driven by an automobile engine, a condenser connected to the high-pressure side of said compressor, orifice means connected to the condenser and an evaporator connected to the low-pressure side of said compressor, said compressor, condenser, orifice means and said evaporator in combination constituting a refrigeration cycle, characterized by comprising: means for detecting the temperature in the passenger's compartment of said automobile; means for setting the optimum temperature in said compartment; and means for detecting the braking state of said automobile; wherein said compressor is driven during braking of said automobile even when the temperature in said compartment is still lower than the set temperature, thereby to operate said refrigeration cycle to store the cold; and further comprising means for detecting the opening degree of a throttle valve of a carburetor attached to said engine, means for detecting the boost pressure of said engine, and comparator means for comparing said boost pressure with a set boost pressure, whereby the braking state of said automobile is detected through the detection of the opening degree of said throttle valve and the detection of said boost pressure.

* * * * *